US012790279B2

(12) United States Patent
Takano et al.

(10) Patent No.: US 12,790,279 B2
(45) Date of Patent: Nov. 10, 2026

(54) DIELECTRIC COMPOSITION AND ELECTRONIC COMPONENT

(71) Applicant: TDK Corporation, Tokyo (JP)

(72) Inventors: Kosuke Takano, Tokyo (JP); Hsing-Wen Yeh, Tokyo (JP); Momoyo Sasaki, Tokyo (JP); Kenichiro Masuda, Tokyo (JP)

(73) Assignee: TDK CORPORATION, Tokyo (JP)

( * ) Notice: Subject to any disclaimer, the term of this patent is extended or adjusted under 35 U.S.C. 154(b) by 197 days.

(21) Appl. No.: 18/962,206

(22) Filed: Nov. 27, 2024

(65) Prior Publication Data

US 2025/0197293 A1 Jun. 19, 2025

(30) Foreign Application Priority Data

Dec. 18, 2023 (JP) ................................ 2023-213292

(51) Int. Cl.

| | |
|---|---|
| ***C04B 35/468*** | (2006.01) |
| ***H01G 4/12*** | (2006.01) |
| *H01G 4/30* | (2006.01) |

(52) U.S. Cl.

CPC ....... *C04B 35/4682* (2013.01); *H01G 4/1227* (2013.01); *H01G 4/1236* (2013.01); (Continued)

(58) Field of Classification Search

CPC ........ C04B 35/4682; C04B 2235/3236; C04B 2235/40; C04B 2235/785; C04B 2235/95; C04B 35/6265; C04B 2235/3206; C04B 2235/3215; C04B 2235/3224; C04B 2235/3225; C04B 2235/3262; C04B 2235/3418; C04B 2235/5445; C04B 2235/6562; C04B 2235/6567; C04B 2235/6582; C04B 2235/6584; C04B 2235/663; C04B 2235/782; C04B 2235/85; C04B 35/638; H01G 4/1227; (Continued)

(56) References Cited

U.S. PATENT DOCUMENTS

| | | | | |
|---|---|---|---|---|
| 11,869,720 | B2 * | 1/2024 | Park | H01G 4/1272 |
| 12,573,554 | B2 * | 3/2026 | Murakami | C04B 35/4682 |

(Continued)

FOREIGN PATENT DOCUMENTS

| | | | | |
|---|---|---|---|---|
| EP | 1327616 B1 | * 12/2010 | | C01G 45/22 |
| JP | 4299827 B2 | * 7/2009 | | C04B 35/62655 |

(Continued)

*Primary Examiner* — Dion R. Ferguson
(74) *Attorney, Agent, or Firm* — Oliff PLC

(57) ABSTRACT

A dielectric composition and an electronic component containing the dielectric composition. A concentration of a first rare earth element at a center of a specific main phase grain having a grain size equal to or larger than an average grain size (D50) of main phase grains observed in a cross section is defined as RA1, a concentration of the first rare earth element at a center of a triple point segregation is defined as RA2, a concentration of a second rare earth element at the center of the specific main phase grain is defined as RB1, a concentration of the second rare earth element at the center of the triple point segregation is defined as RB2, RA2/RA1 is 1.0 or more and 2.5 or less, and RB2/RB1 is 3.0 or more and 9.0 or less (preferably 5.0 or more and 7.0 or less).

6 Claims, 2 Drawing Sheets

(52) U.S. Cl.
CPC .. *C04B 2235/3236* (2013.01); *C04B 2235/40* (2013.01); *C04B 2235/785* (2013.01); *C04B 2235/95* (2013.01); *H01G 4/30* (2013.01)

(58) Field of Classification Search
CPC ...... H01G 4/1236; H01G 4/30; H01G 4/1245; H01G 4/1209; H01G 4/1218
See application file for complete search history.

(56) References Cited

U.S. PATENT DOCUMENTS

| | | | | |
|---|---|---|---|---|
| 2007/0191211 | A1* | 8/2007 | Hosono | H01G 4/1227 501/139 |
| 2014/0036407 | A1* | 2/2014 | Taniguchi | H01G 4/30 501/137 |
| 2014/0240896 | A1* | 8/2014 | Morigasaki | H01G 4/30 501/138 |
| 2016/0268045 | A1* | 9/2016 | Kaneko | H01G 4/30 |
| 2016/0307701 | A1* | 10/2016 | Park | H01G 4/1245 |
| 2022/0254567 | A1* | 8/2022 | Murakami | C04B 35/4682 |
| 2025/0197293 | A1* | 6/2025 | Takano | H01G 4/1236 |

FOREIGN PATENT DOCUMENTS

| | | | | | |
|---|---|---|---|---|---|
| JP | 2014070015 | A | * | 4/2014 | H01G 4/1227 |
| JP | 2016204250 | A | * | 12/2016 | H01G 4/1227 |
| JP | 6091760 | B2 | | 3/2017 | |
| WO | WO-2012111520 | A1 | * | 8/2012 | H01G 4/1227 |

* cited by examiner

DIELECTRIC COMPOSITION AND ELECTRONIC COMPONENT

BACKGROUND OF THE INVENTION

Field of the Invention

The present invention relates to a dielectric composition and an electronic component.

Description of the Related Art

For example, with an increase in use of electrical equipment in automobiles, dielectric compositions used in laminated ceramic capacitors are required to have large capacitance and high reliability. As a general technique for increasing capacitance, a technique of "thinning an interlayer thickness of dielectric layers" and "increasing a relative dielectric constant of a dielectric material" has been developed (for example, JP6091760B2 (Patent Literature 1) and the like).

In order to increase the relative dielectric constant, it is common to increase a crystal grain size, but increasing the crystal grain size can result in a significant decrease in reliability when the interlayer thickness of dielectric layers is small, as the number of interlayer grains decreases. Conversely, in order to ensure high reliability, it is necessary to reduce the crystal grain size, but in that case, the relative dielectric constant tends to decrease, making it difficult to achieve large capacitance.

When fine dielectric powder is used for thinning and grain growth is caused during sintering in order to increase the relative dielectric constant, it is difficult to stably control the grain size to a predetermined size, and even when a target grain size is achieved, there is a large variation in grain size, resulting in reduced reliability. Dielectric compositions used in electronic components for in-vehicle applications and the like are also required to have excellent high-temperature load lifetime.

Patent Document 1: JP6091760B2

SUMMARY OF THE INVENTION

The present invention has been made in view of the above circumstances, and an object of the present invention is to provide a dielectric composition which is excellent in high-temperature load lifetime and reliability while maintaining a high relative dielectric constant, and an electronic component containing the dielectric composition.

In order to achieve the above object, a dielectric composition according to one aspect of the present invention is A dielectric composition, containing: a main component expressed by $ABO_3$; a first rare earth element; and a second rare earth element, in which the first rare earth element is one or more selected from the group consisting of Dy, Tb, Gd, and Eu, the second rare earth element is one or more selected from the group consisting of Y, Yb, and Ho, main phase grains and a triple point segregation surrounded by three or more of the main phase grains are observed in a cross section of the dielectric composition, a concentration of the first rare earth element at a center of a specific main phase grain having a grain size equal to or larger than an average grain size (D50) of the main phase grains observed in the cross section is defined as RA1, a concentration of the first rare earth element at a center of the triple point segregation is defined as RA2, a concentration of the second rare earth element at the center of the specific main phase grain is defined as RB1, a concentration of the second rare earth element at the center of the triple point segregation is defined as RB2, RA2/RA1 is 1.0 or more and 2.5 or less (preferably 1.2 or more and 2.5 or less), and RB2/RB1 is 3.0 or more and 9.0 or less (preferably 5.0 or more and 7.5 or less).

As a result of diligent studies on dielectric compositions, it has been found that by setting RA2/RA1 and RB2/RB1 to predetermined ratios, it is possible to achieve a dielectric composition excellent in high-temperature load lifetime and reliability while maintaining a high relative dielectric constant, so as to complete the present invention. By setting RA2/RA1 and RB2/RB1 to predetermined ratios, it is possible to achieve a dielectric composition excellent in high-temperature load lifetime and reliability while maintaining a high relative dielectric constant.

The average grain size (D50) of the main phase grains is preferably 190 nm or more and 600 nm or less, and more preferably 200 nm or more and 500 nm or less. Within such a range, it becomes easy to achieve a dielectric composition excellent in high-temperature load lifetime and reliability while maintaining a high relative dielectric constant.

A ratio (D100/D50) of a maximum grain size (D100) of the main phase grains to the average grain size (D50) of the main phase grains is preferably 1.8 or less, and more preferably 1.4 or less. Within such a range, it becomes easy to achieve a dielectric composition excellent in high-temperature load lifetime and reliability while maintaining a high relative dielectric constant.

An electronic component according to one aspect of the present invention contains the dielectric composition according to any one described above. An electronic component according to another aspect of the present invention includes a dielectric layer made of the dielectric composition according to any one described above. The dielectric layer may have a thickness of 2 μm or less.

DETAILED DESCRIPTION OF THE PREFERRED EMBODIMENTS

Hereinafter, an embodiment will be described.

Figure 1:
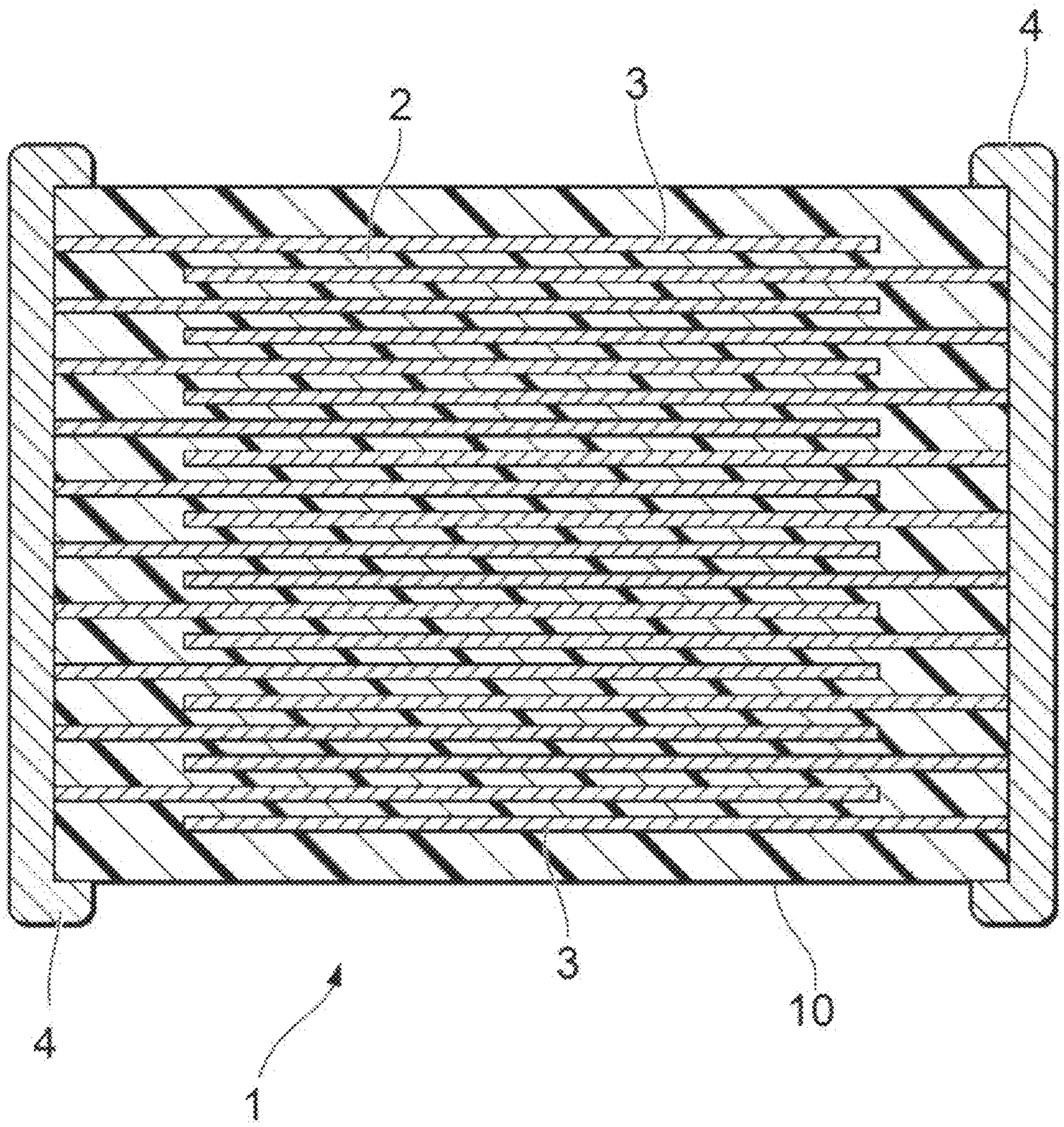
FIG. 1 is a schematic cross-sectional view of a laminated ceramic capacitor as an example of an electronic component according to an embodiment of the present invention.

As shown in FIG. 1, a laminated ceramic capacitor 1 as an example of an electronic component according to the present embodiment includes an element body 10 in which dielectric layers 2 and internal electrode layers 3 are alternately laminated. Both ends of the element body 10 are respectively provided with a pair of external electrodes 4 that are electrically connected to the internal electrode layers 3 arranged alternately inside the element body 10. A shape of the element body 10 is not particularly limited, but is usually a rectangular parallelepiped. There is no particular limitation on dimensions of the element body 10, and the element body 10 may have appropriate dimensions depending on an application thereof.

A thickness of each dielectric layer 2 (interlayer thickness) is not particularly limited, and can be set freely depending on desired characteristics, applications, and the like. Typically, the thickness of the dielectric layer 2 may be 20 μm or less, 10 μm or less, or 5 μm or less, but in the present embodiment, even when the thickness is 2 μm or less, or 1 μm or less, good characteristics are obtained.

The number of laminated dielectric layers 2 is not particularly limited, but in the laminated ceramic capacitor of the present embodiment, it may be, for example, 10 or more, 100 or more, or 200 or more.

In the present embodiment, the internal electrode layers 3 are laminated such that ends thereof are alternately exposed on surfaces of two opposing end surfaces of the element body 10. A conductive material contained in the internal electrode layers 3 is not particularly limited. Examples of noble metals used as the conductive material include Pd, Pt, and Ag—Pd alloys. Examples of base metals used as the conductive material include Ni, Ni-based alloys, Cu, and Cu-based alloys. Note that Ni, Ni-based alloys, Cu or Cu-based alloys may contain various trace elements such as P and/or S in an amount of approximately 0.1 mass % or less.

The internal electrode layer 3 may also be formed using a commercially available electrode paste. A thickness of the internal electrode layer 3 may be appropriately determined depending on an application thereof.

A conductive material contained in the external electrodes 4 is not particularly limited. For example, known conductive materials such as Ni, Cu, Sn, Ag, Pd, Pt, Au, alloys thereof, and conductive resins may be used. A thickness of the external electrode 4 may be appropriately determined depending on an application thereof.

The dielectric layer 2 is made of a dielectric composition according to the present embodiment. The dielectric composition according to the present embodiment contains a main component having a perovskite crystal structure expressed by $ABO_3$, and subcomponents.

In the perovskite crystal structure expressed by $ABO_3$, A is one or more selected from barium (Ba), strontium (Sr) and calcium (Ca). A may be one or more selected from Ba and Sr. A may contain Ba in an amount of 80 mol % or more, or may contain Ba in an amount of 90 mol % or more. A may contain Ba only.

B is one or more selected from titanium (Ti) and zirconium (Zr), and may contain hafnium (Hf), or may be one or more selected from Ti and Zr. B may contain Ti in an amount of 70 mol % or more, or may contain Ti in an amount of 80 mol % or more, or may contain Ti only.

When A is one or more selected from Ba, Sr and Ca, and B is one or more selected from Ti and Zr, a composition of the main components is specifically described as $\{\{Ba_{1-x-y}Ca_xSr_y\}O\}_u(Ti_{1-z}Zr_z)_vO_2$.

It is preferable that 0≤x≤0.10, and more preferable that 0≤x≤0.05. It is preferable that 0≤y≤0.10, and more preferable that 0≤y≤0.05. It is preferable that 0≤z≤0.30, and more preferable that 0≤z≤0.15. It is preferable that 0.997≤u/v≤1.010, and more preferable that 0.998≤u/v≤1.005. If u/v is too high, sintering tends to be insufficient, and a relative dielectric constant and reliability of the dielectric composition also tend to decrease. If u/v is too low, firing stability tends to deteriorate, and a temperature characteristic and reliability of the dielectric composition tend to decrease.

The subcomponents at least include a first rare earth element RA and a second rare earth element RB, and preferably include one or more of silicon (Si), magnesium (Mg), manganese (Mn), vanadium (V), chromium (Cr), cobalt (Co), nickel (Ni), iron (Fe), tungsten (W), molybdenum (Mo), lithium (Li), aluminum (Al), germanium (Ge), boron (B), barium (Ba), calcium (Ca), strontium (Sr), and the like.

In the dielectric composition, a content $C_{RA}$ of RA with respect to the main component is not particularly limited, but is preferably 0.1 mol % or more and 2.0 mol % or less, and more preferably 0.2 mol % or more and 0.6 mol % or less in terms of $RA_2O_3$. A content $C_{RB}$ of RB is not particularly limited, but is preferably 0.1 mol % or more and 2.0 mol % or less, and more preferably 0.2 mol % or more and 0.6 mol % or less in terms of $RB_2O_3$. A content of Si is not particularly limited, but may be 0.1 mol % or more and 3.0 mol % or less in terms of $SiO_2$. When auxiliary component elements other than rare earth elements and silicon is expressed by M, a content of M may be 0.01 mol % or more and 1.0 mol % or less in terms of MO.

Among the rare earth elements contained in the dielectric composition, the first rare earth element RA includes one or more selected from gadolinium (Gd), terbium (Tb), dysprosium (Dy) and europium (Eu). Among the rare earth elements contained in the dielectric composition, the second rare earth element RB includes at least one selected from yttrium (Y), ytterbium (Yb) and holmium (Ho). The dielectric composition may also contain other subcomponent elements, and these elements may be contained in a form of oxides.

RA corresponds to an element having a smaller ionic radius difference with respect to a A-site atom among rare earth elements than an ionic radius difference of RB. RA is preferably one or more selected from Dy, Gd and Tb, more preferably one or more selected from Dy and Gd, and still more preferably RA is Dy. Among rare earth elements, RB corresponds to an element having an ionic radius difference with respect to a A-site atom among rare earth elements larger than that of RA. RB is preferably one or more selected from Y, Yb and Ho, more preferably one or more selected from Y and Yb, and still more preferably RB is Y When RA and RB are the above rare earth elements, temperature characteristic and high-temperature load lifetime are likely to be improved, and reliability is also improved.

Figure 2:
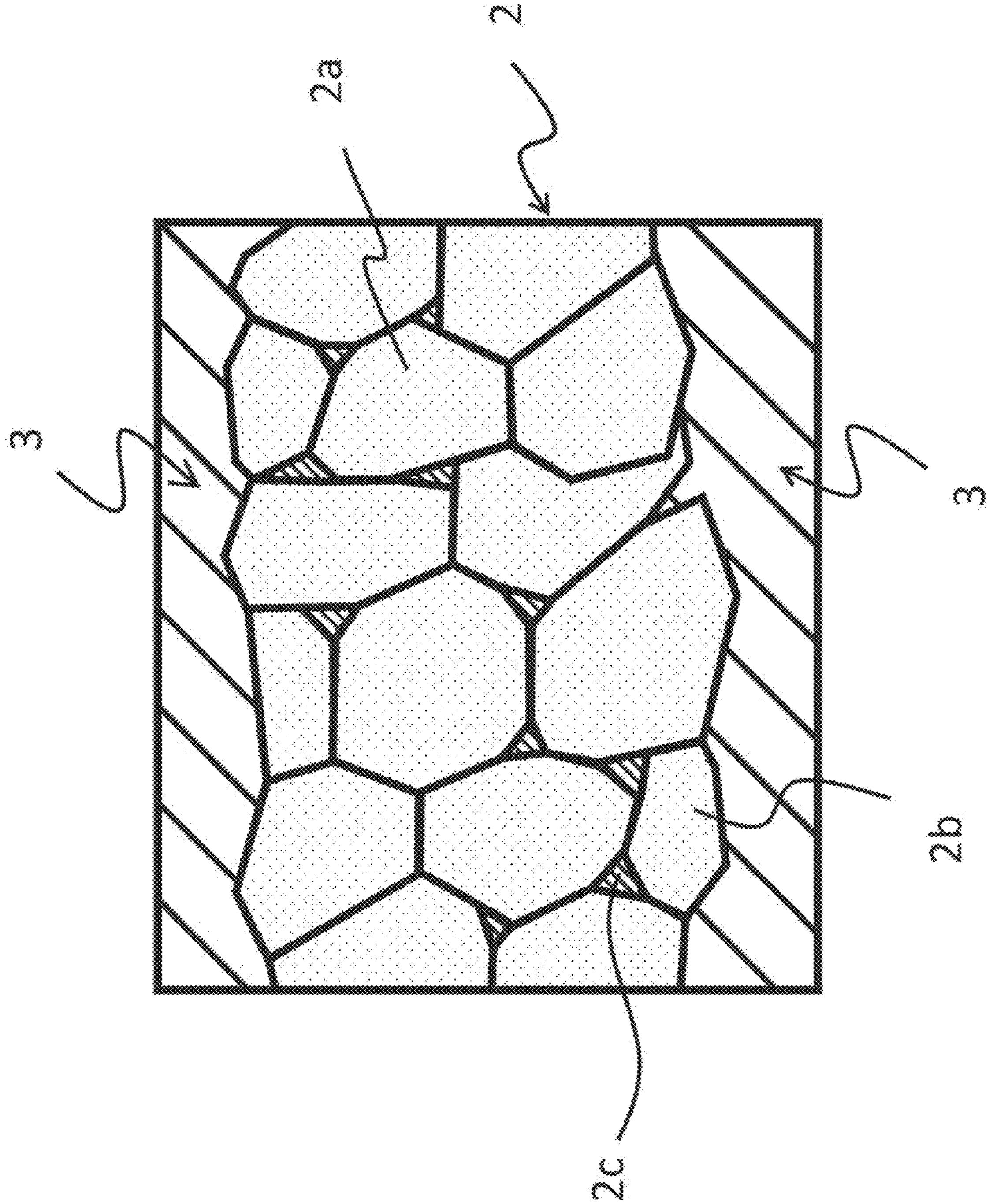
FIG. 2 is an enlarged schematic cross-sectional view of a main portion of a dielectric layer shown in FIG. 1.

As shown in FIG. 2, the dielectric layer 2 of the present embodiment is made of the above dielectric composition, and contains main phase grains (crystal grains) 2*a* and 2*b* and triple point segregations 2*c*.

In the present embodiment, the main phase grains 2*a* and 2*b* contain a compound having a perovskite crystal structure expressed by $ABO_3$ as a main component. Note that the main component of the main phase grains 2*a* and 2*b* is a component that occupies 80 parts by mass or more, and preferably 90 parts by mass or more, with respect to 100 parts by mass of the main phase grains. Note that the main phase grains 2*a* and 2*b* may contain subcomponents other than the above main component.

It is preferable that all of the main phase grains 2*a* and 2*b* within an observed range are main phase grains in which at least a part of the subcomponents is completely dissolved in the main component (hereinafter, sometimes referred to as complete solid solution main phase grains), but at least a part of the main phase grains 2*a* and 2*b* may include grains having a core-shell structure. There is no particular limitation on a ratio of the complete solid solution main phase grains to the main phase grains 2*a* and 2*b*, but it is preferable that the ratio is 90% or more on a number basis.

There is no particular limitation on a composition of the triple point segregation 2*c* shown in FIG. 2. The triple point segregation 2*c* contains RA and RB, and may contain at least one of Si, Mg, and other subcomponents as necessary.

Hereinafter, a relation between the main phase grains 2*a* and 2*b* and the triple point segregation 2*c* in the dielectric composition constituting the dielectric layer 2 according to the present embodiment shown in FIG. 2 will be described.

The main phase grains 2*a* are specific main phase grains having a grain size equal to or greater than an average grain size (for example, median diameter D50) of the main phase grains 2*a* and 2*b* observed in a cross section within a predetermined range of the dielectric layer 2, and the main phase grains 2*b* are main phase grains other than the specific main phase grains 2*a*.

The predetermined observation range of the cross section of the dielectric layer 2 for calculating the average grain size (D50) is an observation range in which at least 500 or more main phase grains 2*a* and 2*b* are observed (the cross section itself may be a cross section of a plurality of locations). Within the observation range of the cross section, a total area of the main phase grains 2*a* and 2*b* is preferably observed to be within a range of 95.0% or more, and a total area of the triple point segregations 2*c* is preferably observed to be within a range of 0.1% to 5.0%, with an area of the dielectric layer 2 being 100%. Within the same observation range, a total number of triple point segregations 2*c* is preferably within a range of 0.2% to 20.0% of a total number of the main phase grains 2*a* and 2*b*.

The main phase grains 2*a* and 2*b* and the triple point segregations 2*c* may be identified and grain sizes, numbers, areas, and the like thereof may be measured, for example, as follows.

First, grain sizes of the main phase grains 2*a* and 2*b* can be obtained by image analysis of a scanning electron microscope (SEM) image of a cross section of the dielectric layer 2 as shown in FIG. 2. An area of each of at least 500 main phase grains 2*a* and 2*b* is measured. The measured area is then converted into a Heywood diameter (equivalent circle diameter) and further converted into an equivalent sphere diameter to obtain grain size distribution. Based on the obtained grain size distribution, a median (for example, a size of the 250th grain out of 500 grains) can be taken as D50, and a maximum value (for example, a size of the 500th grain out of 500 grains) can be taken as D100.

From a viewpoint of increasing a relative dielectric constant, D50 may be preferably 190 nm or more, and more preferably 200 nm or more, and from a viewpoint of increasing the high-temperature load lifetime, D50 may be preferably 600 nm or less, and more preferably 500 nm or less. A ratio (D100/D50) of D100 to D50 may be preferably 1.8 or less, and more preferably 1.4 or less. Within this range, the high-temperature load lifetime is improved.

In the present embodiment, a scanning transmission electron microscope (STEM) is used to compare a mapping image obtained by STEM-EDS of a cross section of the dielectric layer 2 with a backscattered electron image obtained by STEM, and grains in which concentrations of A-site and B-site in $ABO_3$ are higher than those in surroundings can be defined as the main phase grains 2*a* and 2*b*. Among grains whose concentration of RB (that is, Y or Yb) is higher than an average value in a visual field of the cross section and which are in contact with three or more main phase grains 2*a* and 2*b*, grains having an equivalent circle diameter of 5 nm or more and 50 nm or less can be defined as the triple point segregations 2*c*. A boundary between two main phase grains 2*a* and 2*b* is a grain boundary, and a thickness thereof is 5 nm or less.

In the present embodiment, at a center (first point) of a specific main phase grain 2*a* having a grain size of D50 or more, a concentration of RA can be measured as RA1 and a concentration of RB can be measured as RB1. At a center (second point) of the triple point segregation 2*c*, a concentration of RA can be measured as RA2, and a concentration of RB can be measured as RB2. Then, RA2/RA1 and RB2/RB1 can be calculated. The concentrations of RA and RB may be measured by, for example, STEM-EDS. The center of the main phase grain 2*a* and the center of the triple point segregation 2*c* may be defined as a center of gravity calculated from each area thereof.

In the present embodiment, RA2/RA1 is 1.0 or more and 2.5 or less, and preferably 1.2 or more and 2.3 or less. RB2/RB1 is 3.0 or more and 9.0 or less, and preferably 5.0 or more and 7.5 or less. Within such a range, it is possible to improve the high-temperature load lifetime and reliability while maintaining a high relative dielectric constant. Reasons therefor can be considered as follows for example.

In general, as the main phase grains 2*a* and 2*b* grow during firing, a donor component (mainly RA) and an acceptor component (mainly RB and M) are dissolved in the main phase grains 2*a* and 2*b*. In this case, grain growth proceeds too fast, and thus the temperature characteristic is degraded. Furthermore, the reliability of the dielectric composition decreases, and the high-temperature load lifetime decreases. In the present embodiment, it is believed that the triple point segregation (RA2 and RB2) stabilizes the grain growth of the main phase grains (RA1 and RB1) and suppresses local abnormal grain growth, thereby improving the high-temperature load lifetime and reliability while maintaining a high relative dielectric constant. The first rare earth element is dissolved deep to the inside (near the center) of the main phase grains (RA2/RA1 is 1.0 or more and 2.5 or less), which is also thought to improve the high-temperature load lifetime and reliability while maintaining a high relative dielectric constant.

As an example of a method for adjusting RA2/RA1 and RB2/RB1 to predetermined ratios, a compound serving as a segregation containing the second rare earth element may be added separately from a main phase raw material serving as a raw material for the main phase grains. It is also effective to incorporate a compound raw material containing the first rare earth element into the main phase raw material without heat treating the materials together with compound raw materials containing other elements.

An example of a method for producing a laminated ceramic capacitor 1 shown in FIG. 1 will now be described.

The laminated ceramic capacitor 1 of the present embodiment is produced in the same manner as laminated ceramic capacitors in the related art, by preparing a green chip by a normal printing method or sheet method using a paste, firing the green chip, and then printing or transferring external electrodes onto the green chip and firing the resulting chip. The production method will be described in detail below.

First, dielectric raw materials for forming a dielectric layer are prepared, and then the dielectric raw materials are made into a coating material to prepare a dielectric layer paste.

As the dielectric raw materials, a raw material of $ABO_3$ serving as a main component and raw materials of other various oxides are prepared. As these raw materials, oxides of the above-mentioned components, mixtures thereof, and composite oxides thereof can be used, and various compounds that become the above-mentioned oxides or composite oxides by firing, such as carbonates, oxalates, nitrates, hydroxides, and organometallic compounds, can also be appropriately selected and mixed for use.

Note that in the present embodiment, a particle size of a raw material powder of $ABO_3$ serving as a main component is preferably 200 nm or less.

In the present embodiment, an oxide of RB, an oxide of M (for example, MgO), and a compound of Si are mixed in advance, calcined, crushed again, and dried to prepare a heat-treated powder. The obtained heat-treated powder, the raw material of the main component, an oxide of RA, and an oxide of M (for example, MnO) are mixed to prepare the dielectric raw material. Alternatively, a raw material in which the raw material of the main component is coated with the oxide of RB, the oxide of M (for example, MgO), and the compound of Si may be prepared, and then mixed with a raw material of an oxide of A (for example, a raw material of Ba oxide) contained separately from the main component, the oxide of RA, and the oxide of M (for example, MnO) to prepare the dielectric raw material. In this way, ease with which various rare earth elements dissolve in the main phase grains changes, making it possible to adjust RA2/RA1 and RB2/RB1 to be within predetermined ranges.

In the present embodiment, the dielectric raw material in which the main component is coated with the above-mentioned component may be used. Furthermore, other than the raw material of the main component, for example, an oxide of RA, an oxide of RB, an oxide of M, and a compound of Si may be used.

Note that the raw material of $ABO_3$ serving as a main component can be produced by various methods such as various liquid phase methods (for example, an oxalate method, a hydrothermal synthesis method, an alkoxide method, and a sol gel method) in addition to a so-called solid phase method.

Furthermore, when the dielectric layer 2 contains components other than those mentioned above, raw materials of the components may be oxides of those components, mixtures thereof, or composite oxides thereof. In addition, various compounds that become the above-mentioned oxides or composite oxides by firing can be used.

A content of each compound in the dielectric raw material may be determined to obtain a composition of the above-mentioned dielectric composition after firing.

The dielectric layer paste may be an organic coating material obtained by kneading the dielectric raw material and an organic vehicle, or may be an aqueous coating material.

The organic vehicle is obtained by dissolving a binder in an organic solvent. The binder and the solvent may be any known one.

When the dielectric layer paste is an aqueous coating material, the aqueous coating material may be obtained by kneading an aqueous vehicle in which a water-soluble binder and a dispersant are dissolved in water, with the dielectric raw material. The water-soluble binder is not particularly limited, and polyvinyl alcohol, cellulose, water-soluble acrylic resin, and the like may be used.

An internal electrode layer paste may be prepared by kneading the above conductive material made of Ni or a Ni-based alloy, or various oxides, organic metal compounds, resinates or the like that become the above Ni or Ni-based alloy after firing with the above organic vehicle. The internal electrode layer paste may contain an inhibitor. Although the inhibitor is not particularly limited, it preferably has the same composition as the main component.

An external electrode paste may be prepared in the same manner as the internal electrode layer paste described above.

There is no particular limitation on a content of the organic vehicle in each of the above pastes, and a usual content of the binder may be approximately 1 mass % to 15 mass %, a usual content of the solvent may be approximately 10 mass % to 60 mass %.

Furthermore, each paste may contain additives selected from various dispersants, plasticizers, dielectrics, insulators, and the like, as necessary. A total content of these additives may be 10 mass % or less.

When the printing method is used, the dielectric layer paste and the internal electrode layer paste are printed and laminated on a substrate such as PET, cut into a predetermined shape, and then peeled from the substrate to obtain a green chip.

When the sheet method is used, the dielectric layer paste is used to form a green sheet, the internal electrode layer paste is printed thereon, and the printed green sheets are laminated and cut into a predetermined shape to form a green chip.

Before firing, the green chip is subjected to a binder removal treatment. As binder removal conditions, a temperature increase rate is preferably 5° C./hour to 300° C./hour, a binder removal temperature is preferably 180° C. to 900° C., and a retention time is preferably 0.5 hours to 48 hours. An atmosphere during the binder removal treatment is air or a reducing atmosphere (for example, humidified $N_2+H_2$ mixed gas atmosphere).

After the binder is removed, the green chip is fired. For example, a temperature increase rate may be 200° C./h to 20000° C./h, a firing temperature may be 1150° C. to 1350° C., and a retention time may be 0.1 hour to 10 hours.

An atmosphere during firing is not particularly limited. Air or a reducing atmosphere may be used. In the case of a reducing atmosphere, an atmospheric gas can be, for example, a humidified mixed gas of $N_2$ and $H_2$. An oxygen partial pressure may be $1.0\times10^{-4}$ MPa to $1.0\times10^{-9}$ MPa.

The lower the oxygen partial pressure during firing, the easier it is for rare earth elements to be dissolved in the main phase grains. When RA is compared with RB, there is a tendency that RA is easier to be dissolved in the main phase grains. That is, when the oxygen partial pressure during firing is low, a relatively larger amount of RB tends to remain at grain boundaries as compared with RA. By adjusting the oxygen partial pressure, RA2/RA1 and RB2/RB1 can be adjusted at some extent. Furthermore, RA2/RA1 and RB2/RB1 can be adjusted at some extent by the raw material composition of the dielectric composition, particularly by content ratios of the various oxides described above.

In general, as a content of RA relative to RB increases, an amount of RA that does not dissolve in the main phase grains tends to increase. As a content of RB relative to RA increases, an amount of RB that does not dissolve in the main phase grains tends to increase. No matter a content of M is too large or too small, the content of M will affect the amounts of RA and RB that dissolve in the main phase grains.

In the present embodiment, it is preferable to perform an annealing treatment (oxidation treatment of the dielectric layer) on an element body after firing. Specifically, an annealing temperature may be 950° C. to 1100° C. A retention time may be 0.1 hour to 20 hours. An atmosphere during the oxidation treatment may be humidified $N_2$ gas (oxygen partial pressure: $1.0\times10^{-9}$ to $1.0\times10^{-6}$ MPa).

In the above-mentioned binder removal treatment, firing and annealing treatment, when $N_2$ gas or a mixed gas is to be humidified, for example, a wetter or the like may be used. In this case, a water temperature is preferably approximately 5° C. to 75° C.

The binder removal treatment, firing, and annealing treatment may be performed continuously or independently.

The element body obtained as described above is subjected to end surface polishing by, for example, barrel polishing or sandblasting, coated with an external electrode paste and then fired to form an external electrode 4. If necessary, a coating layer is formed on a surface of the external electrode 4 by plating or the like.

A laminated ceramic capacitor of the present embodiment produced in this manner is mounted on a printed circuit board or the like by soldering or the like, and used in various electronic devices and the like.

Note that in the above-described embodiment, a microstructure is controlled by controlling the composition and the firing conditions particularly, but the present invention is not limited thereto.

In the above-described embodiment, the case where an electronic component is a laminated ceramic capacitor has been described, but the electronic component according to the present invention is not limited to a laminated ceramic capacitor and may be any electronic component including the above-described dielectric composition.

For example, it may be a single-plate ceramic capacitor in which a pair of electrodes are formed on the above-mentioned dielectric composition. Moreover, electronic components and laminated electronic components including the dielectric composition according to the present embodiment have a high relative dielectric constant and a long high-temperature load lifetime, and are therefore particularly suitable for use in vehicles.

EXAMPLES

The present invention will be described in further detail below with reference to Examples and Comparative Examples. However, the present invention is not limited to the following Examples.

Example 1

(Preparation of Dielectric Paste)

A $BaTiO_3$ powder (Ba/Ti=1.000) with an average particle size of 120 nm was prepared as a main component $ABO_3$.

With respect to 100 mol of the $BaTiO_3$ powder, 0.6 mol of a $Dy_2O_3$ powder as $RA_2O_3$, 0.3 mol of a $Y_2O_3$ powder as $RB_2O_3$, 0.5 mol of a $SiO_2$ powder, 0.1 mol of a MgO powder, 0.2 mol of a MnO powder, and 0.5 mol of a $BaCO_3$ powder were weighed.

Next, the weighed $Y_2O_3$, MgO and $SiO_2$ were wet mixed in a ball mill for 8 hours. The mixture was then dried at 130° C. and heat-treated at 800° C. The heat-treated powder was again treated in a ball mill for 8 hours and dried at 130° C. to obtain a calcined powder (see Table 1A).

Then, the calcined powder, the $BaTiO_3$ powder, $BaCO_3$, MnO and $Dy_2O_3$ were mixed in a ball mill for 8 hours to obtain a dielectric raw material. Note that $BaCO_3$ is contained in the dielectric composition as BaO after firing.

Next, with respect to 100 parts by mass of the dielectric raw material, 10 parts by mass of polyvinyl butyral resin, 5 parts by mass of dioctyl phthalate (DOP) as a plasticizer, and 100 parts by mass of alcohol as a solvent were mixed in a ball mill to form a paste, thereby obtaining a dielectric layer paste.

(Preparation of Internal Electrode Layer Paste)

A Ni powder, terpineol, ethyl cellulose and benzotriazole were prepared in a mass ratio of 44.6:52.0:3.0:0.4. The mixture was then kneaded with a three-roller milling machine to form a paste, thereby producing an internal electrode layer paste.

(Production of Green Chip)

The above dielectric layer paste was used to form a green sheet on a PET film. A thickness of the green sheet was adjusted to 0.8 μm to 1.2 μm after drying. Next, an electrode layer was printed in a predetermined pattern on the green sheet using an internal electrode layer paste. Thereafter, the green sheet was peeled off from the PET film to prepare a green sheet including the electrode layer. Next, a plurality of green sheets including the electrode layer were laminated and pressure-bonded to obtain a green laminate. This green laminate was cut to a predetermined size to produce a green chip.

(Production of Element Body)

The resulting green chip was then subjected to a binder removal treatment, sintering and oxidation treatment to obtain an element body as a sintered body.

Binder removal treatment conditions include a temperature increase rate of 25° C./h, a binder removal temperature of 235° C., a retention time of 8 hours, and an air atmosphere.

Firing conditions include a temperature increase rate of 200° C./h, a firing temperature of 1120° C. (see Table 1A), a retention time of 2 hours, and a temperature decrease rate of 200° C./h. An atmosphere was a humidified $N_2$+$H_2$ mixed gas atmosphere. The oxygen partial pressure was approximately $5.0\times10^{-11}$ MPa.

Oxidation treatment conditions include a temperature increase rate and a temperature decrease rate of 200° C./h, an oxidation treatment temperature of 1050° C., a retention time of 3 hours, and a humidified $N_2$ gas atmosphere, and an oxygen partial pressure of $1.0\times10^{-7}$ MPa.

A wetter was used to humidify the atmosphere during the firing and oxidation treatment.

(Preparation of Laminated Ceramic Capacitor Sample)

Next, end surfaces of the obtained element body were barrel-polished, and then coated with a Cu paste as external electrodes, followed by a baking treatment in a reducing atmosphere to obtain a sample of the laminated ceramic capacitor shown in FIG. 1. A size of the obtained capacitor sample was 2.0 mm×1.25 mm×1.25 mm, a thickness of the dielectric layer was 1.0 μm or less, and a thickness of the internal electrode layer was 0.8 μm to 1.2 μm. The number of dielectric layers was four.

(Cross Section Observation of Dielectric Layer)

Cross section observation of the main phase grains 2*a* and 2*b* and the triple point segregation 2*c* contained in the dielectric layer 2 was performed as follows. First, the obtained capacitor sample was cut along a plane perpendicular to the internal electrode layers, and the cut surface was wet-polished to obtain a polished surface. Next, the polished surface was subjected to chemical etching. The polished surface at a center of the chip after the chemical etching was observed by SEM.

Furthermore, the cross section of the obtained laminated ceramic capacitor sample was chipped to have a thickness of approximately 100 nm using a focused ion beam (FIB). STEM-EDS mapping analysis was performed on the cross section of the chipped sample. An observation magnification in this case was 30,000 times to 100,000 times.

A mapping image obtained by the STEM-EDS and a backscattered electron image obtained by the STEM were compared, and grains having higher concentrations of Ba and Ti than surroundings were determined to be the main phase grains 2*a* and 2*b*. Among grains whose RB was higher than an average value in the visual field and which were in contact with three or more main phase grains, a grain having an equivalent circle diameter of 5 nm or more and 50 nm or less was defined as the triple point segregation 2*c*.

Areas of at least 500 or more main phase grains 2*a* and 2*b* were measured by image analysis. The measured area was converted into a Heywood diameter, and the converted value was multiplied by 1.27 to obtain an equivalent sphere diameter, from which grain size distribution was obtained. Based on the obtained grain size distribution, a median (for example, a size of the 250th grain out of 500 grains) was taken as D50, and a maximum value (for example, a size of the 500th grain out of 500 grains) was taken as D100.

Based on the obtained mapping image, a composition at a center (first point) of the main phase grain 2*a* having a grain size of D50 or more was subjected to point analysis by EDS to determine RA1 (mol %) and RB1 (mol %). A composition at a center (second point) of the triple point segregation 2*c* was subjected to point analysis by EDS to determine RA2 (mol %) and RB2 (mol %). From the above results, RA2/RA1 and RB2/RB1 were calculated. Results are shown in Table 1B.

(Measurement of Magnetic Properties)

A relative dielectric constant of the laminated ceramic capacitor sample was measured using a digital LCR meter (4274A manufactured by YHP Corporation). Specifically, a capacitance was measured after 24 hours of heat treatment at 150° C. for 1 hour. Measurement conditions include a reference temperature of 25° C., a frequency of 1.0 kHz, and an input signal level (measurement voltage) of 1.0 Vrms. The relative dielectric constant was calculated from the capacitance. The relative dielectric constant of 3000 or more was considered to be good.

A high-temperature load lifetime of the laminated ceramic capacitor sample was evaluated by maintaining the sample in a state in which a direct current voltage of 20 V/μm was applied thereto at 180° C. and measuring the lifetime thereof. In the present example, the lifetime was determined as a time from a start of application until an insulation resistance drops by one digit.

In the present example, the above evaluation was performed on 20 capacitor samples, and a mean time to failure (MTTF) was calculated from the lifetimes of each capacitor sample. When the MTTF was 10 hours or more, the high-temperature load lifetime was judged to be good. Results are shown in Table 1B.

(Reliability)

A voltage application test of 20.0 V/m was performed for 3000 hours at 125° C. for each capacitor sample, and then samples whose insulation resistance had dropped by one digit from the insulation resistance at the start of voltage application were judged to be defective, thereby determining the number of samples with low reliability among 2000 capacitor samples. In the present example, it was determined that the reliability was good when the number of samples with low reliability was zero. Results are shown in Table 1B.

Examples 2 to 8

A dielectric paste and a laminated ceramic capacitor sample were produced in the same manner as in Example 1, except that the firing temperature was changed to the value shown in Table 1A. The same evaluations as in Example 1 were performed on each laminated ceramic capacitor sample. Results are shown in Table 1B.

Examples 9 to 13

A dielectric paste and a laminated ceramic capacitor sample were produced in the same manner as in Example 1, except that the types and amounts of $RA_2O_3$ and $RB_2O_3$ and the firing temperature were changed to the values shown in Table 1A. The same evaluations as in Example 1 were performed on each laminated ceramic capacitor sample. Results are shown in Table 1B.

Example 14

A dielectric paste and a laminated ceramic capacitor sample were produced in the same manner as in Example 3, except that the dielectric raw material was prepared in the following manner. Specifically, RB-coated barium titanate grains were prepared by coating 100 mol of a barium titanate powder having an average particle size of 120 nm as the main component $ABO_3$ with 0.3 mol of $Y_2O_3$, 0.1 mol of MgO, and 0.5 mol of $SiO_2$.

To 100 mol of the main component made of the RB-coated barium titanate grains (100 mol does not include the coating materials), 0.5 mol of $BaCO_3$, 0.2 mol of MnO, and 0.6 mol of $Dy_2O_3$ were added and wet-mixed in a ball mill for 8 hours to prepare the dielectric raw material. The same evaluations as in Example 1 were performed on the laminated ceramic capacitor sample. Results are shown in Table 1B.

Comparative Example 1

A dielectric paste and a laminated ceramic capacitor sample were produced in the same manner as in Example 3, except that the dielectric raw material was prepared in the following manner. Specifically, with respect to 100 mol of the barium titanate powder having an average particle size of 120 nm as the main component $ABO_3$, $Dy_2O_3$, $Y_2O_3$, $BaCO_3$, MnO, MgO, $SiO_2$ were weighed out in the same molar ratio as in Example 3, and without obtaining a calcined powder, the above components were directly wet-mixed in a ball mill for 8 hours to prepare the dielectric raw material. The same evaluations as in Example 1 were performed on the laminated ceramic capacitor sample. Results are shown in Table 2B. Note that Table 2A lists a part of production conditions for producing the sample according to Comparative Example 1.

Comparative Examples 2 to 4

A dielectric paste and a laminated ceramic capacitor sample were produced in the same manner as in Comparative Example 1, except that the firing temperature was changed to the value shown in Table 2A. The same evaluations as in Example 1 were performed on the laminated ceramic capacitor sample. Results are shown in Table 2B.

Comparative Examples 5 and 6

A dielectric paste and a laminated ceramic capacitor sample were produced in the same manner as in Comparative Example 4, except that the average grain size of the barium titanate powder was changed to the value shown in Table 2A. The same evaluations as in Example 1 were performed on the laminated ceramic capacitor sample. Results are shown in Table 2B.

Comparative Example 7

A dielectric paste and a laminated ceramic capacitor sample were produced in the same manner as in Comparative Example 6, except that the firing temperature was changed to the value shown in Table 2A, and the average particle size of the barium titanate powder was changed to the value shown in Table 2A. The same evaluations as in Example 1 were performed on the laminated ceramic capacitor sample. Results are shown in Table 2B.

Comparative Example 8

A dielectric paste and a laminated ceramic capacitor sample were produced in the same manner as in Comparative Example 1, except that $RA_2O_3$ such as $Dy_2O_3$ was not added. The same evaluations as in Example 1 were performed on the laminated ceramic capacitor sample. Results are shown in Table 2B.

Comparative Example 9

A dielectric paste and a laminated ceramic capacitor sample were produced in the same manner as in Comparative Example 1, except that $RB_2O_3$ such as $Y_2O_3$ was not added. The same evaluations as in Example 1 were performed on the laminated ceramic capacitor sample. Results are shown in Table 2B.

Comparative Example 10

A dielectric paste and a laminated ceramic capacitor sample were produced in the same manner as in Comparative Example 8, except that $RA_2O_3$ such as $Dy_2O_3$ was not added, and 0.15 mol of $Y_2O_3$ and 0.15 mol of $Yb_2O_3$ were used as $RB_2O_3$. The same evaluations as in Example 1 were performed on the laminated ceramic capacitor sample. Results are shown in Table 2B.

Comparative Example 11

A dielectric paste and a laminated ceramic capacitor sample were produced in the same manner as in Comparative Example 9, except that $RB_2O_3$ such as $Y_2O_3$ was not added, and 0.3 mol of $Dy_2O_3$ and 0.3 mol of $Tb_2O_3$ were used as $RA_2O_3$. The same evaluations as in Example 1 were performed on the laminated ceramic capacitor sample. Results are shown in Table 2B.

Comparative Example 12

A dielectric paste and a laminated ceramic capacitor sample were produced in the same manner as in Example 14, except that the dielectric raw material was prepared in the following manner. Specifically, (RA+RB)-coated barium titanate grains were prepared by coating 100 mol of barium titanate having an average particle size of 120 nm as the main component with 0.6 mol of $Dy_2O_3$, 0.3 mol of $Y_2O_3$, 0.1 mol of MgO, and 0.2 mol of MnO. To 100 mol of the main component of the barium titanate grains (100 mol does not include the coating materials), 0.5 mol of $BaCO_3$ and 0.5 mol of $SiO_2$ were added and wet-mixed in a ball mill for 8 hours to prepare the dielectric raw material. The same evaluations as in Example 1 were performed on the laminated ceramic capacitor sample. Results are shown in Table 2B.

Evaluations

From the results shown in Tables 1A, 1B, 2A, and 2B, it was found that in each Example in which RA2/RA1 is 1.0 or more and 2.5 or less and RB2/RB1 is 3.0 or more and 9.0 or less, the high-temperature load lifetime and product reliability thereof are better than each Comparative Example while maintaining a high relative dielectric constant. It was also found that when D100/D50 is preferably 1.8 or less, and more preferably 1.4 or less, excellent high-temperature load lifetime and product reliability are achieved while maintaining a high relative dielectric constant.

Furthermore, it was found that when RA2/RA1 is preferably 1.2 or more and 2.5 or less, and more preferably 1.2 or more and 2.3 or less, the high-temperature load lifetime is further improved while maintaining a high relative dielectric constant. It was also found that when RB2/RB1 is 5.0 or more and 7.5 or less, the high-temperature load lifetime is further improved while maintaining a high relative dielectric constant.

Note that in Examples 1 to 14, RA2/RA1 is within the range of 1.0 or more and 2.5 or less, so that the main phase grains (crystal grains) observed in these compositions of Examples 1 to 14 are considered to be completely dissolved grains in which at least a part of subcomponents is sufficiently diffused to near the center of the grains. In Comparative Examples 5 to 7 and 12, RA2/RA1 is 5.5 or more, so that the main phase grains observed in the compositions according to these Comparative Examples are considered to be grains with a core-shell structure in which the subcomponents are not diffused to the center of the grains.

TABLE 1A

| | $BaTiO_3$ | $RA_2O_3$ | | | $RB_2O_3$ | | | Firing temperature |
|---|---|---|---|---|---|---|---|---|
| | nm | | RA | mol | | RB | mol | ° C. |
| Example 1 | 120 | Add to main component | Dy | 0.6 | Add after calcination | Y | 0.3 | 1120 |
| Example 2 | 120 | Add to main component | Dy | 0.6 | Add after calcination | Y | 0.3 | 1130 |
| Example 3 | 120 | Add to main component | Dy | 0.6 | Add after calcination | Y | 0.3 | 1180 |
| Example 4 | 120 | Add to main component | Dy | 0.6 | Add after calcination | Y | 0.3 | 1200 |
| Example 5 | 120 | Add to main component | Dy | 0.6 | Add after calcination | Y | 0.3 | 1220 |
| Example 6 | 120 | Add to main component | Dy | 0.6 | Add after calcination | Y | 0.3 | 1240 |

TABLE 1A-continued

| | $BaTiO_3$ | $RA_2O_3$ | | | $RB_2O_3$ | | | Firing temperature |
|---|---|---|---|---|---|---|---|---|
| | nm | | RA | mol | | RB | mol | ° C. |
| Example 7 | 120 | Add to main component | Dy | 0.6 | Add after calcination | Y | 0.3 | 1250 |
| Example 8 | 120 | Add to main component | Dy | 0.6 | Add after calcination | Y | 0.3 | 1260 |
| Example 9 | 120 | Add to main component | Dy | 0.6 | Add after calcination | Y | 0.2 | 1240 |
| Example 10 | 120 | Add to main component | Dy | 0.2 | Add after calcination | Y | 0.6 | 1240 |
| Example 11 | 120 | Add to main component | Dy | 0.6 | Add after calcination | Yb | 0.3 | 1180 |
| Example 12 | 120 | Add to main component | Tb | 0.6 | Add after calcination | Y | 0.3 | 1180 |
| Example 13 | 120 | Add to main component | Gd | 0.6 | Add after calcination | Y | 0.3 | 1180 |
| Example 14 | 120 | Add to main component | Dy | 0.6 | Coating main component | Y | 0.3 | 1180 |

TABLE 1B

| | D50 nm | D100 nm | D100/D50 — | RA2/RA1 — | RB2/RB1 — | Relative dielectric constant | High-temperature load lifetime h | Product reliability |
|---|---|---|---|---|---|---|---|---|
| Example 1 | 190 | 270 | 1.42 | 2.5 | 9.0 | 3000 | 12 | 0/2000 |
| Example 2 | 200 | 280 | 1.40 | 2.3 | 7.5 | 3010 | 18 | 0/2000 |
| Example 3 | 350 | 410 | 1.17 | 2.5 | 7.5 | 3500 | 16 | 0/2000 |
| Example 4 | 400 | 470 | 1.18 | 2.1 | 6.8 | 3700 | 15 | 0/2000 |
| Example 5 | 450 | 510 | 1.13 | 1.4 | 6.5 | 3910 | 14 | 0/2000 |
| Example 6 | 500 | 550 | 1.10 | 1.2 | 5.0 | 4100 | 13 | 0/2000 |
| Example 7 | 550 | 640 | 1.16 | 1.1 | 4.2 | 4500 | 11 | 0/2000 |
| Example 8 | 600 | 750 | 1.25 | 1.0 | 3.0 | 5000 | 11 | 0/2000 |
| Example 9 | 400 | 550 | 1.38 | 1.9 | 5.8 | 3750 | 13 | 0/2000 |
| Example 10 | 350 | 400 | 1.14 | 2.1 | 6.5 | 3490 | 16 | 0/2000 |
| Example 11 | 350 | 400 | 1.14 | 2.2 | 6.5 | 3520 | 13 | 0/2000 |
| Example 12 | 360 | 410 | 1.14 | 2.1 | 7.3 | 3530 | 12 | 0/2000 |
| Example 13 | 370 | 420 | 1.14 | 2.0 | 7.4 | 3550 | 12 | 0/2000 |
| Example 14 | 360 | 410 | 1.14 | 1.0 | 3.0 | 3550 | 10 | 0/2000 |

TABLE 2A

| | $BaTiO_3$ | $RA_2O_3$ | | | $RB_2O_3$ | | | Firing temperature |
|---|---|---|---|---|---|---|---|---|
| | nm | | RA | mol | | RB | mol | ° C. |
| Comparative Example 1 | 120 | Add to main component | Dy | 0.6 | Add to main component | Y | 0.3 | 1180 |
| Comparative Example 2 | 120 | Add to main component | Dy | 0.6 | Add to main component | Y | 0.3 | 1200 |
| Comparative Example 3 | 120 | Add to main component | Dy | 0.6 | Add to main component | Y | 0.3 | 1220 |
| Comparative Example 4 | 120 | Add to main component | Dy | 0.6 | Add to main component | Y | 0.3 | 1240 |
| Comparative Example 5 | 200 | Add to main component | Dy | 0.6 | Add to main component | Y | 0.3 | 1240 |
| Comparative Example 6 | 350 | Add to main component | Dy | 0.6 | Add to main component | Y | 0.3 | 1240 |
| Comparative Example 7 | 500 | Add to main component | Dy | 0.6 | Add to main component | Y | 0.3 | 1260 |
| Comparative Example 8 | 120 | — | — | — | Add to main component | Y | 0.3 | 1180 |
| Comparative Example 9 | 120 | Add to main component | Dy | 0.6 | — | — | — | 1180 |

TABLE 2A-continued

| | BaTiO₃ | $RA_2O_3$ | | | $RB_2O_3$ | | | Firing temperature |
|---|---|---|---|---|---|---|---|---|
| | nm | | RA | mol | | RB | mol | ° C. |
| Comparative Example 10 | 120 | — | — | — | Add to main component | Y, Yb | 0.3 | 1180 |
| Comparative Example 11 | 120 | Add to main component | Dy, Tb | 0.6 | — | — | — | 1180 |
| Comparative Example 12 | 120 | Coating main component | Dy | 0.6 | Coating main component | Y | 0.3 | 1180 |

TABLE 2B

| | D50 nm | D100 nm | D100/ D50 — | RA2/ RA1 — | RB2/ RB1 — | Relative dielectric constant | High-temperature load lifetime h | Product Reliability |
|---|---|---|---|---|---|---|---|---|
| Comparative Example 1 | 350 | 710 | 2.03 | 1.4 | 1.5 | 3700 | 4 | 3/2000 |
| Comparative Example 2 | 400 | 860 | 2.15 | 1.3 | 1.4 | 3810 | 6 | 3/2000 |
| Comparative Example 3 | 450 | 910 | 2.02 | 1.2 | 1.3 | 4210 | 5 | 17/2000 |
| Comparative Example 4 | 500 | 1010 | 2.02 | 1.1 | 1.1 | 4900 | 5 | 27/2000 |
| Comparative Example 5 | 200 | 580 | 2.90 | 5.6 | 7.2 | 3600 | 5 | 7/2000 |
| Comparative Example 6 | 350 | 700 | 2.00 | 5.6 | 7.2 | 3600 | 5 | 7/2000 |
| Comparative Example 7 | 500 | 920 | 1.84 | 6.2 | 8.1 | 4700 | 4 | 7/2000 |
| Comparative Example 8 | 340 | 700 | 2.06 | — | 5.1 | 3690 | 2 | 6/2000 |
| Comparative Example 9 | 360 | 750 | 2.08 | 1.5 | — | 3710 | 4 | 11/2000 |
| Comparative Example 10 | 340 | 710 | 2.09 | — | 5.7 | 3700 | 3 | 8/2000 |
| Comparative Example 11 | 370 | 770 | 2.08 | 1.4 | — | 3720 | 5 | 15/2000 |
| Comparative Example 12 | 360 | 750 | 2.08 | 5.5 | 6.5 | 3660 | 1 | 12/2000 |

REFERENCE SIGNS LIST

1 laminated ceramic capacitor
10 element body
2 dielectric layer
2*a*, 2*b* main phase grain
2*c* triple point segregation
3 internal electrode layer
4 external electrode

What is claimed is:

1. A dielectric composition, comprising:

a main component expressed by $ABO_3$;

a first rare earth element; and a second rare earth element, wherein the first rare earth element is one or more selected from the group consisting of Dy, Tb, Gd, and Eu, the second rare earth element is one or more selected from the group consisting of Y, Yb, and Ho, main phase grains and a triple point segregation surrounded by three or more of the main phase grains are observed in a cross section of the dielectric composition, a concentration of the first rare earth element at a center of a specific main phase grain having a grain size equal to or larger than an average grain size (D50) of the main phase grains observed in the cross section is defined as RA1, a concentration of the first rare earth element at a center of the triple point segregation is defined as RA2, a concentration of the second rare earth element at the center of the specific main phase grain is defined as RB1, a concentration of the second rare earth element at the center of the triple point segregation is defined as RB2, RA2/RA1 is 1.0 or more and 2.5 or less, and RB2/RB1 is 3.0 or more and 9.0 or less.

2. The dielectric composition according to claim 1, wherein the average grain size (D50) of the main phase grains is 200 nm or more and 500 nm or less.

3. The dielectric composition according to claim 1, wherein a ratio (D100/D50) of a maximum grain size (D100) of the main phase grains to the average grain size (D50) of the main phase grains is 1.8 or less.

4. An electronic component comprising the dielectric composition according to claim 1.

5. An electronic component comprising a dielectric layer made of the dielectric composition according to claim 1.

6. The electronic component according to claim 5, wherein the dielectric layer has a thickness of 2 μm or less.

* * * * *